United States Patent [19]
Ambrose

[11] 3,840,269
[45] Oct. 8, 1974

[54] LATTICE REINFORCED FOAM RUBBER SEAT BUN AND METHOD OF MOLDING SAME

[75] Inventor: Jere B. Ambrose, West Bloomfield, Mich.

[73] Assignee: Northern Fibre Company, Birmingham, Mich.

[22] Filed: May 23, 1973

[21] Appl. No.: 362,920

[52] U.S. Cl. ...................... 297/452, 5/354, 297/458
[51] Int. Cl. ........................... A47c 7/20, A47c 7/14
[58] Field of Search .......... 297/DIG. 1, DIG. 2, 452, 297/456–460; 5/354

[56] References Cited
UNITED STATES PATENTS

| | | | |
|---|---|---|---|
| 3,070,814 | 1/1963 | Withoff | 5/354 |
| 3,239,584 | 3/1966 | Terry et al. | 297/DIG. 2 |
| 3,315,283 | 4/1967 | Larsen | 5/355 |
| 3,487,134 | 12/1969 | Burr | 264/45 |
| 3,630,572 | 12/1971 | Homier | 297/454 |

*Primary Examiner*—Casmir A. Nunberg
*Attorney, Agent, or Firm*—Cullen, Settle, Sloman & Cantor

[57] ABSTRACT

A molded foam rubber-like seat bun formed into the shape of a seat cushion and having a face for resting upon a springy support means. Embedded in the bun is a reinforcing lattice formed of a plurality of thin vertical strands which are joined by a plurality of thin horizontal strands with all the strands being in a first plane. Each strand is formed of a slippery, flexible material which has been uniaxially stretch oriented in its longitudinal direction to increase tensile strength. The foamed rubber-like material extends through the lattice openings between the strands to secure the lattice within the bun to prevent slippage.

2 Claims, 8 Drawing Figures

PATENTED OCT 8 1974 3,840,269
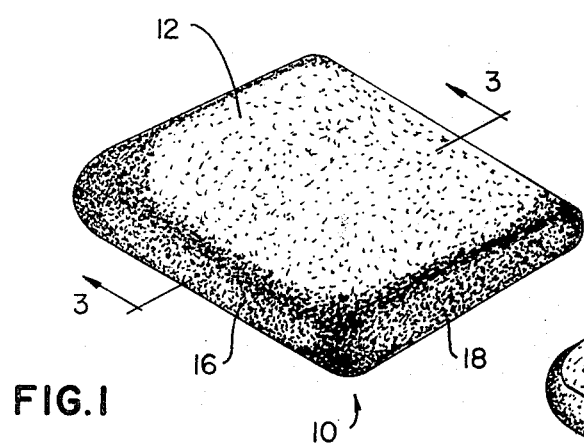
FIG.1
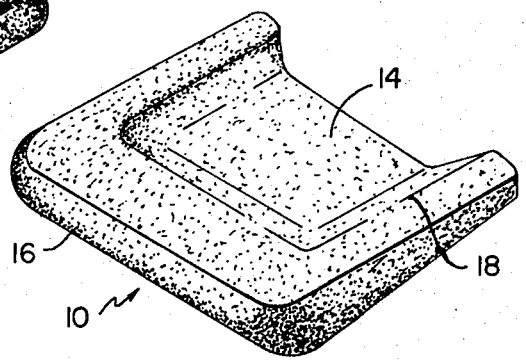
FIG.2
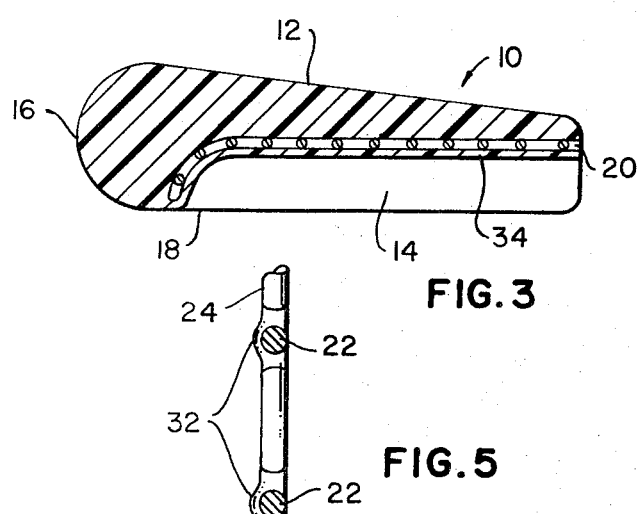
FIG.3
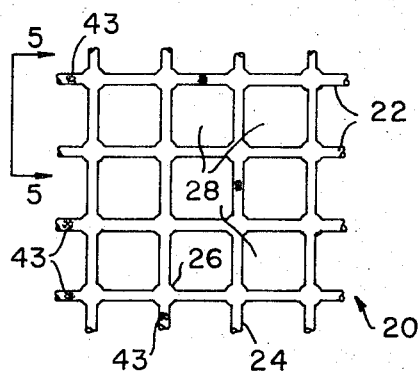
FIG.4
FIG.5
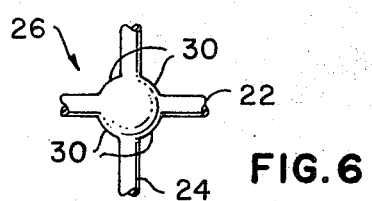
FIG.6
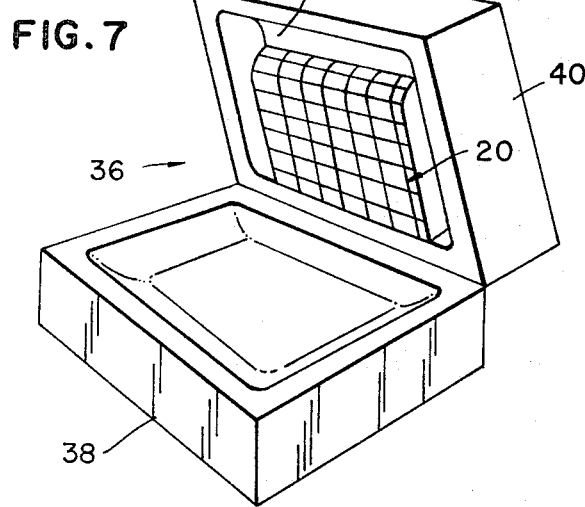
FIG.7
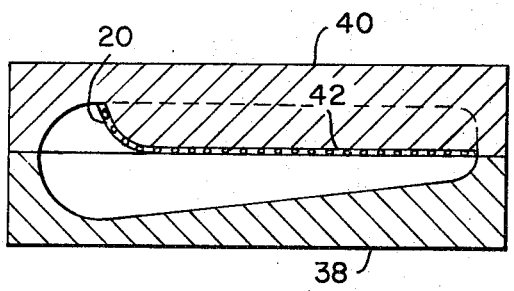
FIG.8

3,840,269

LATTICE REINFORCED FOAM RUBBER SEAT BUN AND METHOD OF MOLDING SAME

BACKGROUND OF THE INVENTION

Seat buns which are utilized as cushions for furniture seats, automobile seats and the like are conventionally molded out of a foam rubber or foamed plastic material such as neoprene or polyurethane. An upholstery material, be it fabric, leather or vinyl, is stretched around and secured to the bun. The bun is then rested upon a springy seat support.

Because of the constant loading and unloading of the seat bun, both by people sitting on it and by people placing objects on it, there is a constant resilient flexing, compression and expansion of the bun. The bun tends to lose its shape and the foamed plastic or rubber-like material tends to tear or crumble, especially at its lower surface where the bun rests upon the seat springs or spring support.

Prior attempts to apply reinforcing material to the bun have been unsatisfactory when used over a long period of time. Such materials, if they are fabric such as burlap, tend to deteriorate over a period of time and do not have the resiliency necessary for repeated flexing and movement of the seat bun.

Thus, the invention herein relates to an improved seat bun having, in combination with the foamy rubber-like or plastic-like bun material, an improved reinforcing material embedded within the bun.

SUMMARY OF THE INVENTION

The invention herein relates to a seat bun molded into a cushion formation and made primarily of a foamed rubber or foamed plastic material. A reinforcing material is embedded within the bun, the reinforcing material being a lattice, mesh or netting formed of a plurality of thin vertical strands which are joined by a plurality of thin horizontal strands with all the strands being in a first plane. Each strand is formed of a slippery, flexible material which has been uniaxially stretch-oriented in its longitudinal direction to increase tensile strength. The foamed rubber-like or plastic-like material extends through the lattice openings to secure the lattice within the bun against slippage. During manufacture of the bun, the netting or lattice is positioned upon a wall of a mold within which the bun is formed and during the molding and foaming of the plastic or rubber-like material, the foaming material extends through the spaces between the strands and coats the surface of the lattice which is adjacent the wall of the mold. Thus, the lattice is embedded at a slight distance below the bun surface.

The joints between the vertical and horizontal strands are integral and lie partially in the first plane and extend partially above the first plane. These joints distribute tensile forces among the various strands so that the material is highly stretch resistant in all of its planar directions and, although it is flexible, the strands are relatively stiff so that the performance of the bun is substantially improved in that it will not rapidly lose its shape.

These and other objects and advantages of the present invention will become apparent upon reading the following detailed description taken in conjunction with the drawings.

BRIEF DESCRIPTION OF DRAWINGS

In the drawings, wherein like reference numerals identify corresponding parts:

FIG. 1 is a perspective view of a seat bun used in an automobile type "bucket" seat;

FIG. 2 is a perspective view of the bun of FIG. 1 turned upside down (inverted);

FIG. 3 is an enlarged cross-section view taken in the direction of the arrows 3—3 of FIG. 1;

FIG. 4 is an illustration of the reinforcing member of the present invention;

FIG. 5 is an end view of the reinforcing member of FIG. 4 taken in the direction of arrows 5—5;

FIG. 6 is an enlarged view of one of the integral joints of the reinforcing member;

FIG. 7 is a perspective view of a mold within which the bun is molded; and

FIG. 8 is a cross-sectional end view of the mold of FIG. 7 in a closed position with the reinforcing member positioned against the wall of the mold.

DETAILED DESCRIPTION

FIG. 1 illustrates a foamed seat bun 10 which may be made of a foamed rubber-like material or a foamed plastic-like material such as neoprene or polyurethane or the like. The bun has an upper seat surface 12, a lower depressed or indented surface 14 and a forward edge portion 16. The depressed or indented lower surface 14 is shaped to rest upon a conventional springy seat support which is utilized in automotive seats. This springy support is omitted here as it is conventional and not a part of the present invention.

The lower portion of the seat bun is formed with a plurality of side beads or ridges 18 which fit around the sides of the springy seat support. It is understood, however, that the bun may be molded in any contour shape desired based upon the purposes for which the bun is to be utilized.

The present invention relates to a reinforcing or insulating member 20 which is embedded within the bun close to its indented lower surface 14. This member 20 is preformed or cut to correct size. The member 20 is in the form of an open lattice, mesh or netting and comprises a plurality of elongated thin horizontal strands 22 which are joined by a plurality of thin elongated vertical strands 24 as at the individual joints 26.

To provide for better operation and life of the seat bun with minimum deterioration and crumbling, there are certain characteristics of the lattice which are necessary. First, the lattice must be flexible enough so that it may be compressed with the seat bun when a load is placed upon the seat. Second, each of the strands must have a certain degree of longitudinal resiliency so that there is no tensile fracture of the strands when a load is placed on or removed from the seat. However, this longitudinal resiliency must be limited to avoid stretching of the strands.

Another characteristic of the strands is that they be operated within their elastic limit to avoid fatigue. Additionally, since the temperature inside a closed automobile may reach quite low limits in cold weather and may reach quite hot limits if the automobile is left parked in the sun in hot weather, the strands must maintain their desired characteristics within a temperature range of approximately −50°F to approximately +200°F.

A critical feature is that the lattice material must be able to distribute any uneven tension among the strands such as those occasioned by an uneven loading or unloading of the seat bun. Such uneven loading would occur if a heavy object is placed on the forward portion 16 of the seat bun.

A preferred material to be used for the strands of the netting is stretch oriented polypropylene. However, other polymerized resinous plastics and fluoridated hydrocarbons may also be satisfactory. The reinforcing member 20 is formed as an open netting or mesh having spaces 28 between adjacent strands. These spaces are substantially wider than the thickness of an individual strand. The benefit of this open space construction is that it permits the foamed plastic or foamed rubber-like material of the bun to flow through the spaces and thereby cover the underside of the reinforcing member 20. With the foamed bun material filling the spaces 28, the strands 22 and 24 are embedded within the bun and secured against slippage.

The reinforcing member 20, which may be extruded, has all of its vertical and horizontal strands in a first plane. Each joint 26 is integrally formed between a horizontal strand and a vertical strand. Viewed from the front of the reinforcing lattice as in FIGS. 4 and 6, each joint 26 includes four arcuate portions 30 connecting the strands together. Viewed from the side of the netting or lattice as in FIG. 5, each joint lies substantially in the plane of the strands with the joint having a protrusion or bump 32 extending slightly above the first plane. This bump 32 serves to further secure the reinforcing member against slippage within the foamed bun.

Each strand 22, 24 is uniaxially stretch-oriented in its longitudinal direction to increase the tensile strength of the strand. When the strands are placed together in a lattice or net, the finished reinforcing member has the property of being biaxially stretch-oriented in both the vertical and horizontal directions.

One importance of the integral joints 26 is that they transmit the stress from one strand to another strand. Therefore, upon the uneven loading or unloading of the seat bun, the reinforcing member 20 distributes the stress through the joints 26 to the various strands. This reduces the compression on the bun itself.

When the reinforcing lattice 20 is embedded within the bun 10, the plastic or rubber-like material extends through the spaces 28 and forms a thin layer or coating 34 on the bottom surface of the bun 10 below the lattice member 20.

FIGS. 7 and 8 illustrate a typical molding apparatus, illustrated conventionally, and generally comprising a mold 36 within which the bun is formed. The mold cavity is typically inverted so that the bun is formed upside down. Thus, the lower mold half 38 molds the upper half of the bun and the upper mold half 40 molds the lower half of the bun.

In the process of molding the bun, first the reinforcing member 20 is preformed to size and placed within the mold and applied to the mold wall 42. This may be done by placing adhesive 43 on the various strands. The adhesive may be of a permanent, tacky type or may be a volatilizable adhesive.

Thereafter, the raw plastic-like or rubber-like material is inserted into the lower mold portion 38 and the mold is closed. Then, the appropriate amount of heat is provided for the mold causing the plastic-like or rubber-like material to foam and mold into shape.

During the foaming and molding, while the mold is closed, the bun material foams through the open spaces 28 between the various strands and between the reinforcing member 20 and the mold wall 42. By virtue of this foaming through the spaces, the reinforcing lattice 20 becomes embedded within the bun with a thin coating 34 covering the lower exposed surface of the reinforcing lattice 20. With the bun material extending through the spaces, the reinforcing lattice is maintained in a relatively stationary position with respect to the bun.

After the mold is opened, the bun with the reinforcing member embedded therein is removed and the bun may then be processed in the normal way by covering it with upholstery material as explained previously. The improved bun is highly resistant to tearing or crumbling during the upholstering process, the subsequent handling and installation in an automobile, and the subsequent use by the owner of the automobile. The reinforcing lattice 20 provides a sufficient stiffening for the bun material so that the upholstery fabric may be readily applied without distorting the bun.

Having fully described an operative embodiment of the present invention, what is claimed is:

1. In a seat bun or the like formed of a foamed plastic material molded and shaped into a seat cushion form having an upper seat surface, a forward edge and an indented lower support face upon which the bun is supported by a support means, the improvement comprising:

a plurality of thin, elongated vertical strands intersected and joined by a plurality of thin horizontal strands to form an open lattice;

each of said strands being formed of a material characterized by being flexible, of limited resiliency, slippery and being uniaxially stretch-oriented in its longitudinal direction;

said lattice lying in a first plane with all the intersections being integral joints partially lying in said first plane and having projections extending above said plane;

said lattice being embedded within the foamed plastic material to reinforce the foamed plastic material against deterioration, tearing and crumbling, said lattice positioned just interiorly of the indented lower support face so that the foamed plastic material extends through the lattice openings and forms a thin coating over the lattice; and at least some of the projections on said integral joints being interlocked into said foamed plastic material for securing said lattice within said bun against slippage in a direction transverse to said first plane.

2. The construction as in claim 1 wherein all of said projections are interlocked into said foamed plastic material.

* * * * *